July 29, 1958            R. W. GRADY            2,844,884
INSTRUMENT FOR MEASURING THE RADIAL HOOK OR RAKE OF TAPS
Filed Jan. 15, 1954            2 Sheets-Sheet 1
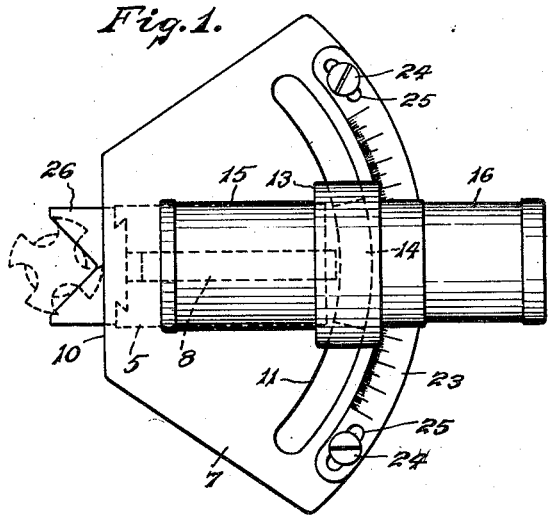
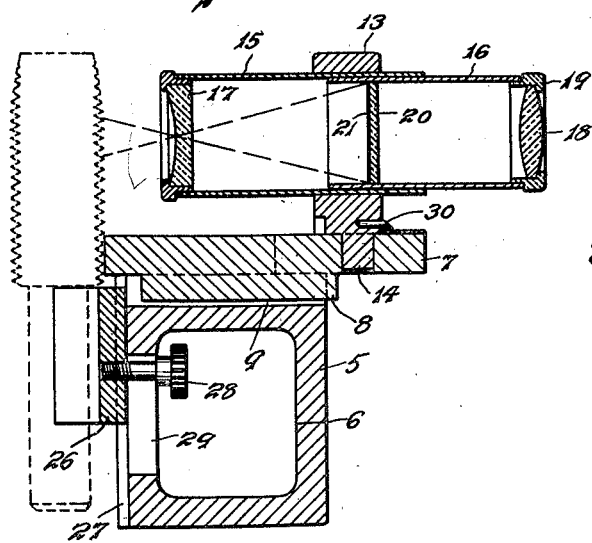
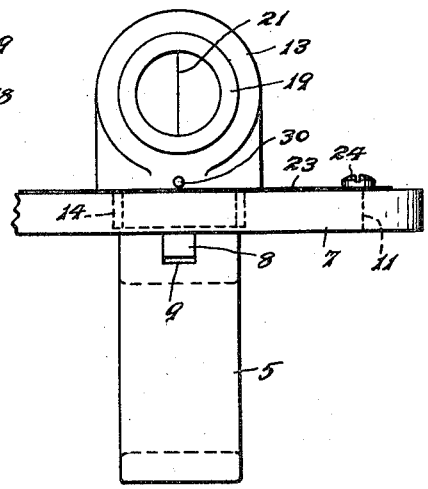
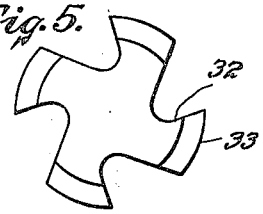
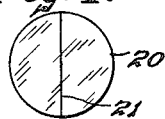
INVENTOR.
ROBERT W. GRADY.
BY
*Louis V. Lucia*
ATTORNEY.

July 29, 1958 R. W. GRADY 2,844,884
INSTRUMENT FOR MEASURING THE RADIAL HOOK OR RAKE OF TAPS
Filed Jan. 15, 1954 2 Sheets-Sheet 2
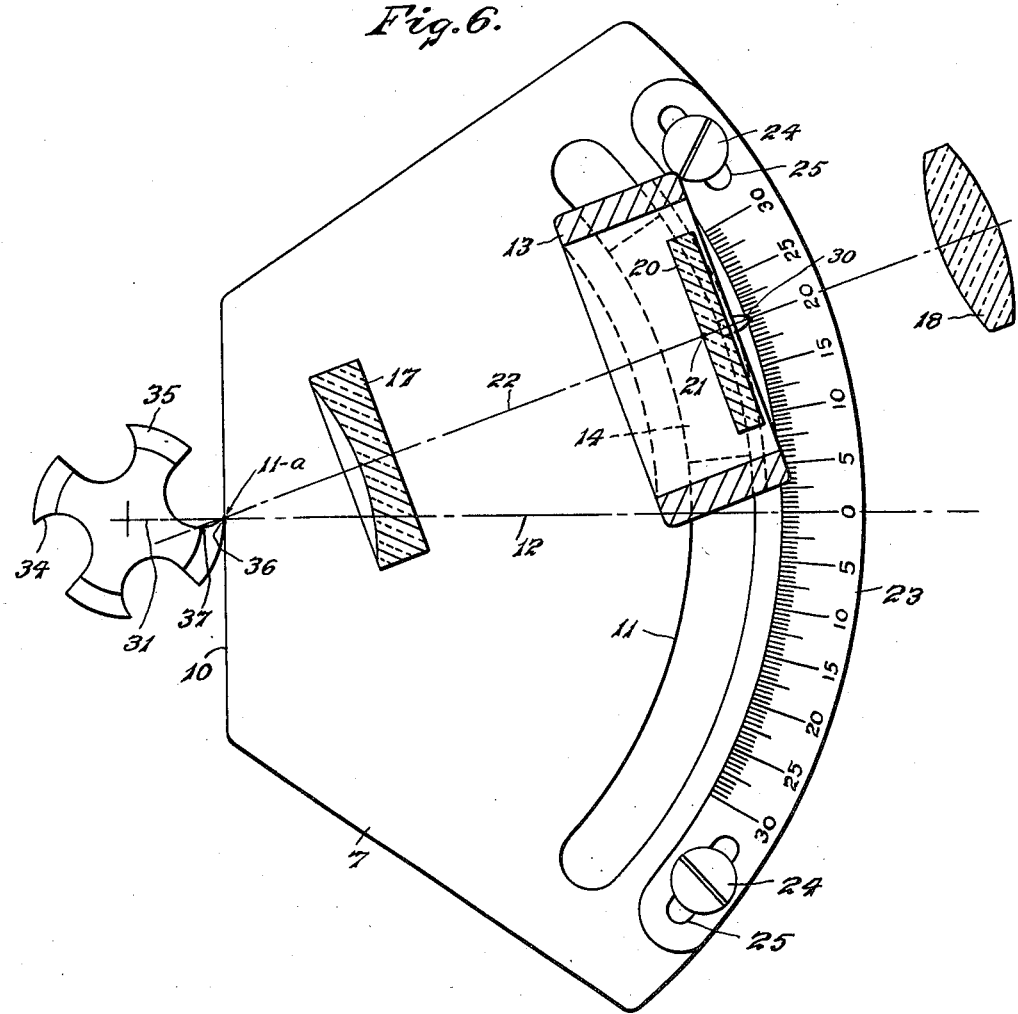
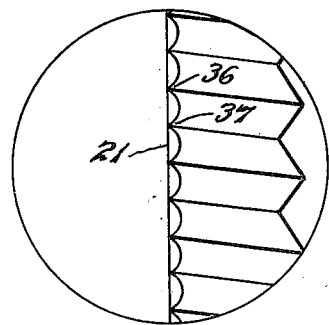
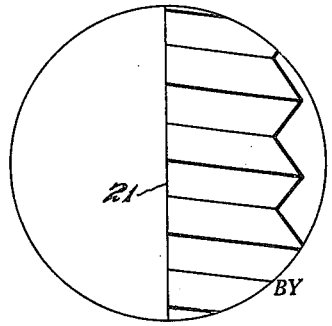
INVENTOR.
ROBERT W. GRADY.
BY
Louis V. Lucia
ATTORNEY.

United States Patent Office 2,844,884
Patented July 29, 1958

2,844,884
INSTRUMENT FOR MEASURING THE RADIAL HOOK OR RAKE OF TAPS

Robert W. Grady, West Hartford, Conn.

Application January 15, 1954, Serial No. 404,175

8 Claims. (Cl. 33—201)

This invention relates to an instrument for measuring the radial hook or rake of taps and more particularly to an instrument for determining the angle of the hook or the rake of a conventional tap.

It is well known that accuracy in the angle of the hook or rake of a tap is very important for obtaining best results in the use of taps for cutting threads and such accuracy is particularly important in that portion of the tap reaching to the first full thread of the tap or in the vicinity thereof.

Heretofore, it has been the practice to measure the said angle of the rake or hook by setting up the tap between the centers of a machine, such as a small lathe or the like, and then reading the dimensional variation between the cutting face, measured from the crest to the root of the thread, and a plane perpendicular to the axis of the tap; the usual measuring instrument being a dial indicator, mounted on the cross-slide of the machine, and the dimensional variation is then developed trigonometrically to determine the hook or rake. Such methods of measuring taps, however, have been very unsatisfactory, for the reason that the set-up is bulky, time-consuming and inconvenient and, in the case of hooks the result is merely a chordal reading from the crest to the root of the thread which gives no information as to the shape of the cutting face.

It is an object of the present invention, therefore, to provide an instrument which may be readily used for quickly and accurately determining the angles of the rake or hook of a tap.

A further object of the invention is to provide such an instrument which may be held in the hand for locating a tap therein and sighting the angle of its hook or rake.

A still further object is to provide such an instrument which can be easily and quickly adjusted to accurately measure the angle of the rake or hook of a tap placed therein and to clearly indicate said angle upon a suitable scale.

Further objects of this invention will be more clearly understood from the following description and from the accompanying drawings in which:

Fig. 1 is a plan view of an instrument embodying my invention with a tap shown therein in dotted lines.

Fig. 2 is a view of said instrument in central vertical section.

Fig. 3 is a rear view of said instrument.

Fig. 4 is a rear view of a transparent disc used for supporting a hairline in said instrument.

Fig. 5 is a top view of a tap having a rake.

Fig. 6 is an enlarged top view, partly in section, illustrating the use of my improved instrument for determining the hook of a tap.

Fig. 7 is a view showing the hook of a tap thread as viewed through said instrument when properly adjusted.

Fig. 8 is a similar view showing the rake of a tap being viewed through the instrument.

In the embodiment of my invention which is illustrated in the drawings, the numeral 5 denotes a base which is preferably rectangular and has a finger-receiving opening 6 therein to facilitate holding of the instrument. Upon the said base there is mounted a table 7 which is slidable thereon and connected thereto by means of a depending rib 8 on the bottom of said table which fits in a groove 9 in the top of the base.

The said table 7 has a front edge portion 10 and an arcuate slot 11 which is on a radius having its center 11-a located at the intersection of the edge 10 with the normal longitudinal axis 12 of the table along which axis the said table is slidable upon the base 5.

A supporting member 13 is slidable upon the table along the slot 11 and has an arcuate tongue portion 14 which fits closely within the slot 11 to accurately position the member 13 upon the table and permit movement thereof along said slot and about its center.

A magnifying measuring device, preferably in the form of a low-power compound microscope, is mounted on the said supporting member and includes a tube section 15, which fits snugly in an opening in the supporting member and is slidable therein, and a second tube section 16 which is slidable in the section 15. A suitable object lens 17 is provided in the front end of the tube 15 and a magnifying lens 18 is provided in the eyepiece 19 at the rear end of the tube 16. A transparent disc 20 is mounted in the tube 16 at a suitable distance from the lens 18 for the purpose of supporting a hairline 21 upon the focal plane of the object when viewed through the lens 17. The longitudinal axis 22 of the said microscope lies in a plane extending through the center 11-a at the front edge 10 of the table 7.

An arcuate protractor scale 23 is mounted upon the surface of the table 7 adjacent to the slot 11 and is adjustably secured thereto by means of screws 24—24 extending through slots 25—25 in said scale for permitting adjustment of the scale along the slot in order to accurately position the zero point of said scale upon the normal axis 12 of the table.

Upon the base 5 there is provided a V-block 26 which is preferably slidable in a dove-tailed slot 27 in the front of the base and is adjustably secured to the base by means of a clamping screw 28 that extends through a vertical slot 29, permitting vertical adjustment of the V-block for properly positioning taps of different lengths with relation to the focal axis of the microscope.

A suitable pointer 30 is carried by the supporting member 13 in the vertical plane of the longitudinal axis 22 of the microscope and said pointer cooperates with graduations on the protractor scale 23 to denote the angle of the microscope with relation to the axis 12 of the table on which the zero point of the said scale is located.

It will be noted that the normal axis 12 of the table lies in a plane 31 extending perpendicularly from the edge 10 and along the vertical axis of the V in the V-block 26 so that the said axis 12 will always intersect the vertical axis of any tap, regardless of its size, which is placed in said V for measurement.

My above described instrument is adapted for measuring the angle of the rake 32 in a tap 33, such as shown in Fig. 5, or the hook 34 of a tap 35, such as shown in Fig. 6.

Assuming that the said instrument is accurately calibrated so that, when the axis 22 of the microscope is located upon the axis 12 of the table, the indicator pointer 30 will be upon the zero mark of the scale 23, the hook of a tap, such as 35, may be measured in the following manner:

The tap 35 is first placed in the V of the V-block and the said block is then adjusted vertically on the base 5 to position the tap at the desired height for properly locating the teeth of the tap which are to be measured with respect to the microscope and the table is moved upon the base 5 until the front edge 10 thereof engages the tap as shown in Fig. 6. The said tap is then viewed through the microscope and rotated in the V-block until the points 36 at the crests of the teeth are seen upon the hairline 21. In this position, the said points 36 will lie along the axis of rotation of the microscope which extends vertically through the center 11-a. After the said points 36 of the teeth have been accurately located along the hairline 21 and the microscope has been properly focused for best viewing the said points 36, and the points 37 of said teeth at the root diameter of the tap, the microscope is swung on the table 7 along the slot 11 until the root points 37 are also seen, through said microscope, in line with the hairline 21. At this time, the teeth of the tap will appear through the microscope as illustrated in Fig. 7 where both the root points 37 and the crest points 36 are aligned with and lie along the vertical hairline 21. When the tap teeth are so seen, the microscope is disposed at the same angle as the hook of the tap teeth being measured and the said angle may be quickly determined by reading the angle indicated on the scale by the pointer 30, as clearly illustrated in Fig. 6.

When the rake 32, such as shown in Fig. 5, is to be measured, the tap 33 is positioned and the instrument is used in the same manner as above described for measuring the hook of a tap, and the microscope is swung upon the table and about the center 11-a until the teeth of the tap are seen therethrough as illustrated in Fig. 8. In this position, the axis of the microscope lies along the face of the tap teeth and the angle of rake may be determined by the position of the pointer upon the scale 23.

It will be clearly understood from the above description that, when the tap is properly located for measurement in said instrument and the table 7 is moved so that the front edge 10 thereof will engage the points 36 of the teeth to be measured, the said points will be located upon the normal axis of the table, which is also the axis of the zero point, and upon the center of the arc about which the axis 22 of the microscope is swung as the said microscope is moved along the slot 21 in adjusting the instrument.

I claim:

1. A tap rake or hook measuring instrument including a base, adjustable means on said base for supporting a tap, a table slidable upon said base and having a front edge portion engageable with the crests of teeth of said tap, measuring means adjustable about a center point located at the said edge portion, the said tap being rotatable in said supporting means to permit alignment of the points at the crests of the tap teeth to be measured with the said center point, an arcuate scale on said table adjacent to the path of movement of said measuring means, and an indicator movable with said measuring means and cooperative with the said scale to indicate the position of the measuring means about the said center point.

2. A tap rake or hook measuring instrument including a base, means on said base for adjustably supporting a tap, a table slidable on said base and having an edge portion adapted to engage the crests of teeth of said tap and a normal axis intersecting the said edge portion, a supporting member adjustable on said table along an arc having its center at the intersection of said edge portion and normal axis, the said tap being rotatable in the supporting means to permit alignment of the points at the crests of the teeth to be measured with the said center point, a magnifying device mounted in said supporting member and adapted to be focused upon the said points of the teeth, the said magnifying device having a hairline located at the focal plane of said teeth when viewed through said device, a protractor scale positioned adjacent to the said supporting member and disposed along an arc parallel to the arcuate movement of the supporting member on the table, the said scale having a zero point upon said normal axis, and a pointer on said supporting member cooperative with said scale for indicating thereon the angular position of the magnifying device relatively to said normal axis.

3. An instrument for measuring the rake or hook of a tap including a base, a table slidably mounted upon said base and having a front edge portion, a supporting member slidably mounted upon said table and movable thereon along an arc having its center upon the said front edge portion, the said table having a normal axis crossing said center point, means on said base for supporting a tap with the axis of said top perpendicular to the normal axis of the table and permitting adjustment of said tap to locate the points at the crests of the teeth of said tap upon the said center point, a magnifying device carried upon said supporting member with the axis of said magnifying device on a plane intersecting said center point, a hairline carried in said magnifying device and disposed perpendicularly to said axis, a protractor scale parallel to the arc along which said supporting member is slidable upon the table and having a zero point located upon the said normal axis, and indicating means carried by said supporting member and cooperative with said scale to indicate the angle at which the said magnifying device is adjusted relatively to the said zero point.

4. An instrument for measuring the rake or hook of a tap including a base, a tap supporting V-block on said base, a table slidable on said base in the direction of a tap supported in said V-block and having a free edge portion engageable with the crests of teeth of said tap, the said table having a normal axis perpendicular to the axis of said tap and on a line intersecting the said free edge portion and the axis of the tap, a measuring device adjustable on said table about a center point located at the intersection of said free edge portion and normal axis, and means for indicating the angle of said measuring device relatively to said normal axis.

5. An instrument for measuring the rake or hook of a tap including a base, a tap supporting V-block adjustable on said base, means for securing said V-block in adjusted position on said block, a table slidable on said base in the direction of a tap supported in the V of said block and having a free edge portion engageable with the crest of teeth of said tap, the said table having a normal axis perpendicular to the axis of said tap and on a line intersecting the said free edge portion and the axis of the tap, a measuring device having an axis adjustable on said table about a center located at the intersection of said free edge portion and normal axis, the said measuring device including a supporting member mounted upon said table and movable in an arc about said center, a tube mounted upon said supporting member and carrying a focusing lens upon said axis of the measuring device, a separate tube telescoped within the first tube, a hairline extending across the said separate tube and adjustable therewith relatively to the focusing lens to be located upon the focal plane of said lens, a magnifying lens carried on said separate tube and focused upon said hairline, a protractor scale on said table disposed along the path of movement of the said measuring device, and means movable with the said measuring device for indicating upon said scale the angle of the axis thereof relatively to the said normal axis.

6. An instrument for measuring the rake or hook of a tap including a base, a tap supported V-block vertically adjustable on said base, a clamping screw for securing said block in adjusted position upon the base, a table slidable upon said base in the direction of a tap supported in said V-block and having a free edge portion engageable with the crest of teeth of said tap, the said table having a normal axis intersecting the said free edge portion and the axis of the said tap, the said table having an arcuate slot therein with its center located at the intersection of said free edge portion and normal axis, a supporting member movable upon said table and having an arcuate projection extending into the slot for guiding the supporting member along said slot, an arcuate scale disposed parallel to said slot and having its zero point upon the said normal axis, a measuring device mounted on said supporting member and having its axis intersecting a vertical axis through said center point, a hairline in said measuring device intersecting the said axis thereof and parallel to a vertical axis through the center point, a focusing lens in said measuring device focused upon a vertical axis through the center point and having a focal plane at said hairline, the said hairline being adjustable along the axis of said measuring device relatively to said focusing lens, a magnifying lens movable with said hairline along the axis of the measuring device, and a pointer carried by said supporting member and cooperating with the said scale for indicating thereon the angle of the axis of said measuring device relatively to the said normal axis.

7. An instrument for measuring the rake or hook of a tap including a base, a tap supporting V-block adjustable on said base, a clamping screw for securing said V-block in adjusted position, a table slidable on said base in the direction of a tap supported in said V-block and having a free edge portion engageable with the crests of teeth of said tap, the said table having a normal axis perpendicular to the axis of said tap and on a line intersecting the said free edge and the axis of the tap, a measuring device adjustable on said table about an axis located at the point of intersection between said free edge portion and said normal axis, the said measuring device having an axis intersecting the last named axis, a hairline in said measuring device intersecting the axis thereof, a scale on said table having its zero point upon the said normal axis, and means movable with the measuring device for indicating on said scale the angle of the axis of said measuring device relatively to said normal axis.

8. An instrument as set forth in claim 7 wherein the said scale is adjustable upon the table for calibrating the said instrument.

References Cited in the file of this patent

UNITED STATES PATENTS

| | | |
|---|---|---|
| 1,338,639 | Lillberg | Apr. 27, 1920 |
| 1,662,836 | Steinle | Mar. 20, 1928 |
| 1,671,152 | Graves | May 29, 1928 |
| 2,648,138 | Gase | Aug. 11, 1953 |
| 2,682,799 | Hartridge | July 6, 1954 |

FOREIGN PATENTS

| | | |
|---|---|---|
| 876,855 | France | Aug. 24, 1942 |
| 904,282 | France | Feb. 19, 1945 |
| 254,284 | Switzerland | Dec. 16, 1948 |
| 994,312 | France | Aug. 8, 1951 |